US012503956B2

(12) United States Patent
Backus et al.

(10) Patent No.: US 12,503,956 B2
(45) Date of Patent: Dec. 23, 2025

(54) CLOSED BRAYTON CYCLE POWER GENERATION SYSTEM WITH COMPRESSOR DISCHARGE FLUID DRIVEN COOLING FLOW FOR COOLING ELECTRICAL HARDWARE

(71) Applicant: Rolls-Royce North American Technologies Inc., Indianapolis, IN (US)

(72) Inventors: Neil Backus, Indianapolis, IN (US); Stanford Clemens, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/933,153

(22) Filed: Oct. 31, 2024

(65) Prior Publication Data
US 2025/0146424 A1    May 8, 2025

Related U.S. Application Data

(60) Provisional application No. 63/596,226, filed on Nov. 3, 2023.

(51) Int. Cl.
*F01D 15/10*    (2006.01)
*H02K 7/18*    (2006.01)
*H02K 9/10*    (2006.01)

(52) U.S. Cl.
CPC ........... *F01D 15/10* (2013.01); *H02K 7/1823* (2013.01); *H02K 9/10* (2013.01)

(58) Field of Classification Search
CPC ......... F01D 15/10; H02K 9/10; H02K 7/1823
See application file for complete search history.

(56) References Cited

U.S. PATENT DOCUMENTS

| 3,864,919 A | 2/1975 | Frutschi |
| 4,293,384 A * | 10/1981 | Weber ............. G21D 9/00 376/391 |
| 4,761,957 A | 8/1988 | Eberhardt et al. |
| 5,165,239 A | 11/1992 | Bechtel et al. |

(Continued)

FOREIGN PATENT DOCUMENTS

GB    2612836 A    5/2023

OTHER PUBLICATIONS

Ka At-Attab and Za Zainal, Externally Fired Gas Turbine Technology: A Review, Aug. 8, 2014, 14 pages.

(Continued)

*Primary Examiner* — Shafiq Mian
(74) *Attorney, Agent, or Firm* — Barnes & Thornburg

(57) ABSTRACT

A power-generation system includes an electrical system, a turbine engine, and a pump. The turbine engine includes a compressor configured to receive and compress a working fluid, a heat source that transfers heat to the compressed working fluid, a turbine fluidly connected with the compressor to extract work from the heated working fluid, and a first heat-exchanger fluidly connected with the turbine to transfer heat away from the heated working fluid to provide a cooled working fluid. The pump conducts a portion of the cooled working fluid from the first heat-exchanger to the electrical system to cool components of the electrical system.

20 Claims, 2 Drawing Sheets

(56) References Cited

U.S. PATENT DOCUMENTS

| | | | |
|---|---|---|---|
| 5,799,490 | A | 9/1998 | Bronicki et al. |
| 9,752,462 | B1 | 9/2017 | Fletcher |
| 11,499,474 | B2 | 11/2022 | Michalik et al. |
| 11,680,472 | B2 | 6/2023 | Zhong et al. |
| 2005/0097896 | A1 | 5/2005 | Critchley et al. |
| 2007/0280400 | A1* | 12/2007 | Keller .................... F01K 23/16 376/317 |
| 2010/0050639 | A1 | 3/2010 | Janus et al. |
| 2010/0064688 | A1 | 3/2010 | Smith |
| 2015/0240665 | A1 | 8/2015 | Stapp |
| 2019/0178111 | A1 | 6/2019 | Uechi et al. |
| 2020/0191051 | A1 | 6/2020 | Homison et al. |
| 2022/0029454 | A1 | 1/2022 | Sweet et al. |
| 2022/0252006 | A1* | 8/2022 | Michalik .................. F02C 1/04 |
| 2023/0155388 | A1 | 5/2023 | Fernando |

OTHER PUBLICATIONS

Colin F. Mcdonald and Charles R. Boland, The Nuclear Closed-Cycle Gas Turbine—Dry Cooled Commercial Power Plant Studies, Nov. 1979, https://www.osti.gov/servlets/purl/5664698, 21 pages.
International Atomic Energy Agency, Gas Turbine Power Conversion Systems for modular HTGRs, Aug. 2001, https://www-pub.iaea.org/MTCD/Publications/PDF/te_ 1238_prn.pdf, 216 pages.

* cited by examiner

FIG. 2

CLOSED BRAYTON CYCLE POWER GENERATION SYSTEM WITH COMPRESSOR DISCHARGE FLUID DRIVEN COOLING FLOW FOR COOLING ELECTRICAL HARDWARE

CROSS REFERENCE TO RELATED APPLICATIONS

This application claims priority to and the benefit of U.S. Provisional Patent Application No. 63/596,226, filed 3 Nov. 2023, the disclosure of which is now expressly incorporated herein by reference.

FIELD OF THE DISCLOSURE

The present disclosure relates generally to closed Brayton cycle power-generation systems, and more specifically to cooling electrical hardware that is powered by such systems.

BACKGROUND

Brayton cycle power-generation systems may be used to power spacecraft, aircraft, watercraft, and power generators. Conventional power-generation systems include a turbine engine having a compressor configured to compress a working fluid, a heat source for heating the compressed working fluid, and a turbine that extracts work from the heated compressed working fluid to power a fan, shaft, generator, etc. Power-generation systems may be open loop or closed loop.

In some systems, the heat from the heat source is transferred to the working fluid with a heat exchanger such that no combustion products travel through the compressor or the turbine. This may allow externally-heated gas turbine engines to operate with fuel sources that may ordinarily damage or are not compatible with the internal components of the system. In closed Brayton cycle systems, the working fluid is recirculated through the compressor, the heat exchanger, and the turbine. In open Brayton cycle systems, new working fluid may be continuously introduced to the compressor.

The components of the power-generation system, including electrical systems powered by the turbine engine, generate heat during operation. There remains interest in cooling the components and electrical systems in Brayton cycle power-generation systems.

SUMMARY

The present disclosure may comprise one or more of the following features and combinations thereof.

A power-generation system may comprise an electrical system, a turbine engine, and a cooling system. The electrical system may include a motor-generator and a power conditioning and distribution system connected with the motor-generator. The motor-generator may be operable in a power generation mode to produce electrical energy and a motor mode to convert electrical energy into rotational power. The turbine engine may include a compressor, a reactor heat-exchanger, a turbine, and a cooling heat-exchanger. The compressor may be configured to receive a working fluid and compress the working fluid to provide a compressed working fluid. The reactor heat-exchanger may be downstream of the compressor that transfers heat from a nuclear reactor to the compressed working fluid to provide a heated working fluid. The turbine may be downstream of the reactor heat-exchanger and configured to extract work from the heated working fluid for driving the compressor and the motor-generator.

The cooling heat-exchanger may be downstream of the turbine to transfer heat away from the heated working fluid to provide a cooled working fluid. The cooling system may use the cooled working fluid to cool the electrical system. The cooling system may include a pump that moves the cooled working fluid from the cooling heat-exchanger to the electrical system to transfer heat from at least one of the motor-generator and the power conditioning and distribution system to the cooled working fluid. The pump may be fluidly connected with the compressor and driven by the compressed working fluid to increase a pressure of the cooled working fluid received by the pump.

In some embodiments, the pump may be fluidly connected downstream of the cooling heat-exchanger and upstream of the electrical system to conduct the cooled working fluid from the cooling heat-exchanger toward the electrical system. The pump may be fluidly connected downstream of the electrical system and upstream of the cooling heat-exchanger to draw the cooled working fluid from the cooling heat-exchanger through the electrical system.

In some embodiments, the pump may be driven solely by the compressed working fluid. The pump may be one of an ejector pump and an impulse turbine. The turbine engine and the cooling system may be fluidly connected and provide a closed loop system.

In some embodiments, the turbine engine may further include a heat recuperator that transfers heat from the heated working fluid received from the turbine to the compressed working fluid passing from the compressor to the reactor heat-exchanger. The motor-generator may be coupled with the compressor and configured to operate in the motor mode to start the turbine engine and to operate in the power generation mode to be driven by the turbine and generate the electrical energy. The power-generation system may further comprise a check valve arranged downstream of the pump to prevent backflow of the cooled working fluid.

According to another aspect of the present disclosure, a power-generation system may comprise an electrical system, a turbine engine, and a pump. The electrical system may include a motor-generator and electrical equipment connected with the motor-generator. The turbine engine may include a compressor, a heat source, a turbine, and a first heat-exchanger. The compressor may be configured to receive a working fluid and compress the working fluid to provide a compressed working fluid. The heat source may transfer heat to the compressed working fluid to provide a heated working fluid. The turbine may be fluidly connected with the compressor to extract work from the heated working fluid. The first heat-exchanger may be fluidly connected with the turbine to transfer heat away from the heated working fluid to provide a cooled working fluid. The pump may be in fluid communication with the first heat-exchanger and driven by the compressed working fluid received from the compressor to conduct a portion of the cooled working fluid from the first heat-exchanger to the electrical system to cool at least one of the motor-generator and the electrical equipment.

In some embodiments, the heat source may include a second heat-exchanger configured to transfer heat from a nuclear reactor to the compressed working fluid. The heat source may include a third heat-exchanger fluidly connected with the turbine and configured to transfer heat from the heated working fluid received from the turbine to the compressed working fluid passing from the compressor to the second heat-exchanger.

In some embodiments, the pump may be fluidly connected downstream of the first heat-exchanger and upstream of the electrical system to conduct the cooled working fluid from the first heat-exchanger toward the electrical system. The pump may be fluidly connected downstream of the electrical system and upstream of the first heat-exchanger to draw the cooled working fluid from the first heat-exchanger through the electrical system. The pump may be one of an ejector pump and an impulse turbine. The turbine engine and the pump may be fluidly connected and provide a closed loop system.

A method of operating a power-generation system is provided herein. The method may comprise compressing a working fluid with a compressor to provide a compressed working fluid. The method may comprise heating the compressed working fluid to provide a heated working fluid. The method may comprise extracting work from the heated working fluid with a turbine after the heating to provide a low-pressure working fluid. The method may comprise cooling the low-pressure working fluid after extracting the work from the heated working fluid to provide a cooled low-pressure working fluid. The method may comprise driving a generator with the work extracted from the turbine to produce electrical energy. The method may comprise conducting the electrical energy to electrical equipment. The method may comprise increasing a pressure of the cooled low-pressure working fluid using a portion of the compressed working fluid to provide pressurized cooled working fluid. The method may comprise cooling at least one of the generator and the electrical equipment with the pressurized cooled working fluid.

In some embodiments, the method may further comprise recirculating the pressurized cooled working fluid through the power-generation system. A pump may be fluidly connected with the compressor and may be driven by the compressed working fluid to increase the pressure of the cooled low-pressure working fluid. The pump may be fluidly connected upstream of the generator and the electrical equipment to conduct the pressurized cooled working fluid toward the generator and the electrical equipment.

BRIEF DESCRIPTION OF THE DRAWINGS

FIG. 2 is a diagrammatic view of another embodiment of a power-generation system similar to the system of FIG. 1 in which the pump is arranged downstream of the electrical system of the power-generation system, the pump being driven by the compressed working fluid to draw the cooled working fluid from the cooling heat-exchanger to electronic hardware of the electrical system.

DETAILED DESCRIPTION OF THE DRAWINGS

Figure 1:
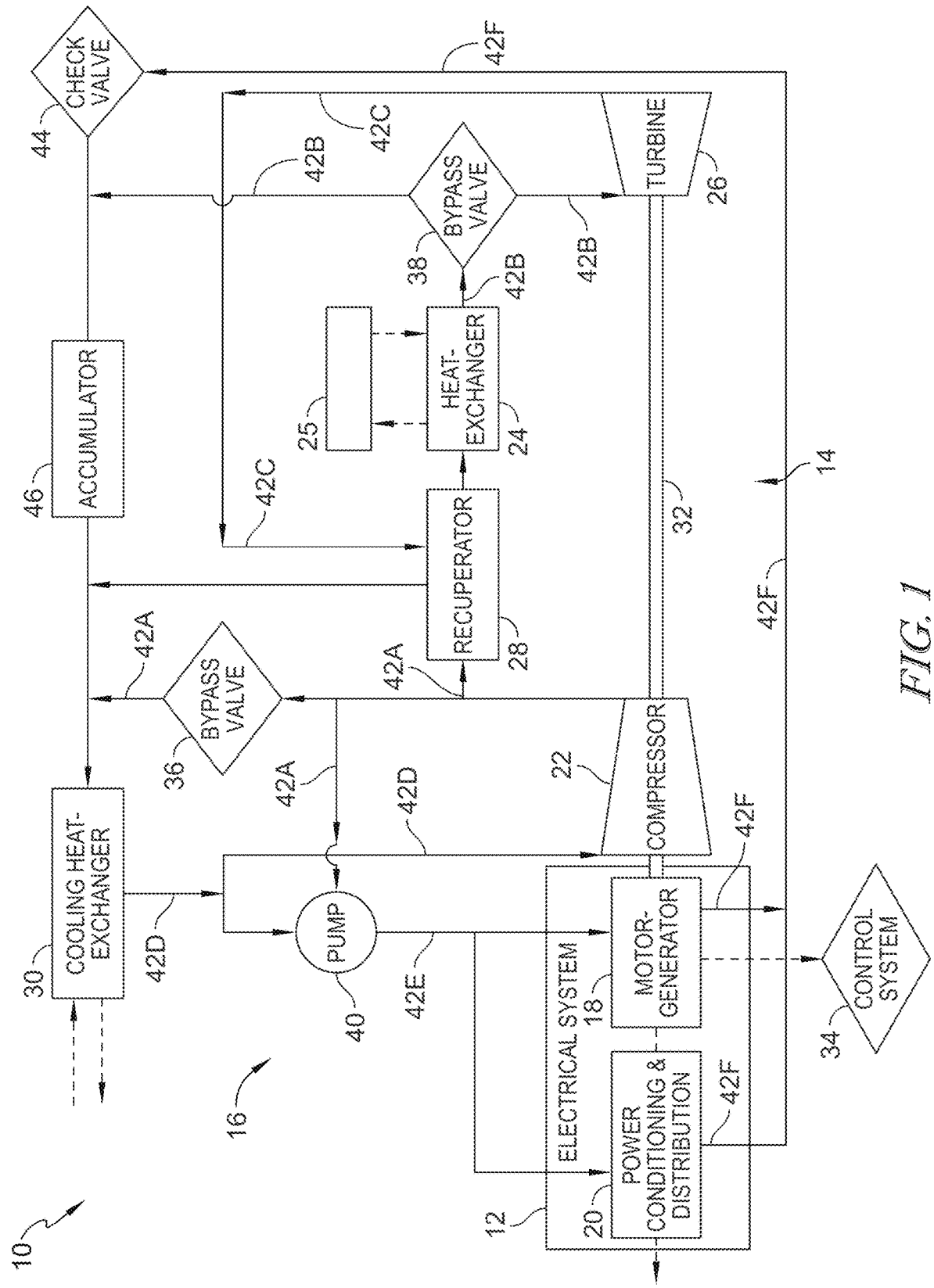
FIG. 1 is a diagrammatic view of a power-generation system according to the present disclosure, the system includes a compressor for compressing a working fluid, a heat source for heating the working fluid, a turbine which extracts heat from the working fluid to drive a motor-generator, and a cooling heat-exchanger for cooling the working fluid, the system further includes a pump arranged between the cooling heat-exchanger and an electrical system of the power-generation system, the pump being driven by the compressed working fluid and arranged to conduct the cooled working fluid from the cooling heat-exchanger to electronic hardware of the electrical system.

For the purposes of promoting an understanding of the principles of the disclosure, reference will now be made to a number of illustrative embodiments illustrated in the drawings and specific language will be used to describe the same.

An illustrative power-generation system 10 includes an electrical system 12, a turbine engine 14, and a cooling system 16, as shown in FIG. 1. The electrical system 12 includes a motor-generator 18 and a power conditioning and distribution system 20 coupled with the motor-generator 18. The turbine engine 14 includes a compressor 22 that compresses a working fluid 42D to provide compressed working fluid 42A, a heat source 24 downstream of the compressor 22 that heats the compressed working fluid 42A to provide heated compressed working fluid 42B, and a turbine 26 downstream of the heat source 24 that extracts work from the heated compressed working fluid 42B to provide low-pressure working fluid 42C. Illustratively, the heat source 24 is a reactor heat-exchanger 24.

In some embodiments, the turbine engine 14 includes an optional heat recuperator 28 that pre-heats the compressed working fluid 42A using heat from the low-pressure working fluid 42C, as shown in FIG. 1. The turbine engine 14 further includes a cooling heat-exchanger 30 arranged downstream of the turbine 26 that cools the low-pressure working fluid 42C received from the turbine 26 to provide cooled low-pressure working fluid 42D.

The cooling system 16 cools the electrical system 12. Cooled low-pressure working fluid 42D that is discharged from the cooling heat-exchanger 30 has a relatively low pressure compared to a pressure of the compressed working fluid 42A and the heated compressed working fluid 42B. The compressed working fluid 42A has a relatively high pressure compared to pressures of the working fluid at other locations within the closed-loop power-generation system 10. Thus, to direct the cooled low-pressure working fluid 42D toward the electrical system 12, a portion of the compressed working fluid 42A from the compressor 22 is used to pressurize the cooled low-pressure working fluid 42D so that pressurized cooled working fluid 42E is directed to the electrical system 12 (via heat exchangers or other heat transfer methods). After passing through the electrical system 12, the working fluid 42F may be a warmed working fluid 42F.

Providing cooling to the electrical system 12 using the pressurized cooled working fluid 42E may increase reliability of the electrical system 12 and a life span of the electrical system 12 without using a separate and/or independent cooling system and cooling fluid for the electrical system 12. The turbine engine 14 and the cooling system 16 are fluidly connected and provide a closed-loop power-generation system 10. As such, the same working fluid 42A, 42B, 42C, 42D, 42E, 42F is recirculated through the system 10, as shown in FIG. 1.

With an initial description of the system 10 provided above, the system 10 is hereafter described in further detail. The compressor 22 of the turbine engine 14 receives and compresses the cooled low-pressure working fluid 42D to provide the compressed working fluid 42A, as shown in FIG. 1. The compressed working fluid 42A is conducted toward the heat recuperator 28. The compressed working fluid 42A flows from an outlet of the compressor 22, through the heat recuperator 28, and to the reactor heat-exchanger 24, as shown in FIG. 1. The reactor heat-exchanger 24 transfers heat from a nuclear reactor 25 to the compressed working fluid 42A to provide heated compressed working fluid 42B.

In the illustrative embodiment, the reactor heat-exchanger 24 is fluidly coupled with the nuclear reactor 25 to transfer heat from a hot fluid of the nuclear reactor 25 to the compressed working fluid 42A. In other embodiments, other heat sources may be used to heat the compressed working fluid 42A. A portion of the compressed working fluid 42A may also be conducted from the outlet of the compressor 22 toward the cooling heat-exchanger 30 via a bypass valve 36 if operating conditions (pressure, temperatures, etc.) are met.

The heated compressed working fluid 42B from the reactor heat-exchanger 24 is conducted to an inlet of the turbine 26, as shown in FIG. 1. A portion of the heated compressed working fluid 42B may also be conducted toward the cooling heat-exchanger 30 via a bypass valve 38 if operating conditions (pressure, temperatures, etc.) are met. The turbine 26 extracts work from the heated compressed working fluid 42B to drive the compressor 22 and the motor-generator 18 through a shaft 32. The compressor 22 and the motor-generator 18 are directly driven by the turbine 26 in the illustrative embodiment. In other embodiments, the compressor 22 and/or the motor-generator 18 are indirectly driven by the turbine 26 via transmissions, gearboxes, additional generator/battery systems, etc.

In the illustrative embodiment, from an outlet of the turbine 26, a low-pressure working fluid 42C flows to the heat recuperator 28, as shown in FIG. 1. The heat recuperator 28 is arranged between the compressor 22 and the reactor heat-exchanger 24. The heat recuperator 28 receives the low-pressure working fluid 42C from the turbine 26 and transfers heat from the low-pressure working fluid 42C to the compressed working fluid 42A passing from the compressor 22 to the reactor heat-exchanger 24. Thus, heat is transferred to the compressed working fluid 42A in each of the heat recuperator 28 (via the low-pressure working fluid 42C) and the reactor heat-exchanger 24 (via the hot fluid of the nuclear reactor 25) before the heated compressed working fluid 42B flows to the inlet of the turbine 26. In other embodiments, the heat recuperator 28 is omitted.

The low-pressure working fluid 42C flows from the heat recuperator 28 to the cooling heat-exchanger 30, as shown in FIG. 1. The cooling heat-exchanger 30 is located downstream of the turbine 26 and the heat recuperator 28. The cooling heat-exchanger 30 transfers heat away from the low-pressure working fluid 42C via a cooling fluid flowing through the cooling heat-exchanger 30. The cooling heat-exchanger 30 may also receive a portion of the heated compressed working fluid 42B from the reactor heat-exchanger 24 depending on the position of the bypass valve 38 and/or a portion of the compressed working fluid 42A from the outlet of the compressor 22 depending on the position of the bypass valve 36.

Cooled low-pressure working fluid 42D exits the cooling heat-exchanger 30 and flows toward the compressor 22 and the cooling system 16, as shown in FIG. 1. A majority of the cooled low-pressure working fluid 42D flows to the compressor 22 where it is compressed to provide compressed working fluid 42A, and the compressed working fluid 42A recirculates through the cycle of the turbine engine 14.

A portion of the cooled low-pressure working fluid 42D is conducted to the cooling system 16, as shown in FIG. 1. In the illustrative embodiment, an amount of cooled low-pressure working fluid 42D conducted to each of the cooling system 16 and the compressor 22 is preset, and the ducting of the system 10 is sized accordingly. In other embodiments, valving is used to control the amount of cooled low-pressure working fluid 42D conducted to each of the cooling system 16 and the compressor 22.

The cooling system 16 includes a pump 40, as shown in FIG. 1. The pump 40 is fluidly connected with the cooling heat-exchanger 30 and the compressor 22. The pump 40 is arranged downstream of the cooling heat-exchanger 30 and upstream of the electrical system 12. In a closed Brayton cycle, a pressure of the cooled low-pressure working fluid 42D is relatively low. In accordance with the present disclosure, the cooling system 16 increases the pressure of the cooled low-pressure working fluid 42D to drive the cooled low-pressure working fluid 42D through the electrical system 12 and increase cooling efficiency. The pump 40 is driven by a portion of the compressed working fluid 42A received from the compressor 22. The portion of the compressed working fluid 42A drives the pump 40 so that the cooled low-pressure working fluid 42D received by the pump 40 from the cooling heat-exchanger 30 is pressurized to provide pressurized cooled working fluid 42E. In the illustrative embodiment, the pump 40 is solely driven by the compressed working fluid 42A.

In the illustrative embedment, the compressed working fluid 42A is received by the pump 40 from the outlet of the compressor 22 as compressor discharge fluid. In other embodiments, the compressed working fluid 42A is received by the pump 40 from a lower stage of the compressor 22 as low-pressure or intermediate pressure working fluid. The compressed working fluid 42A received by the pump 40 from the compressor 22 is mixed with the cooled low-pressure working fluid 42D as a result of driving the pump 40, which may increase the temperature of the cooled low-pressure working fluid 42D. However, any increase in temperature of the cooled low-pressure working fluid 42D is outweighed by the benefit of the increased pressure for cooling the electrical system 12.

The pressurized cooled working fluid 42E is directed toward the electrical system 12 to transfer heat from the motor-generator 18 and the power conditioning and distribution system 20 to the pressurized cooled working fluid 42E to cool the motor-generator 18 and the power conditioning and distribution system 20, as shown in FIG. 1. More specifically, a portion of the pressurized cooled working fluid 42E is directed to the motor-generator 18 and another portion of the pressurized cooled working fluid 42E is directed to the power conditioning and distribution system 20.

A working fluid 42F discharged from each of the motor-generator 18 and the power conditioning and distribution system 20 is directed toward a check valve 44 that prevents backflow of the working fluid 42F toward the electrical system 12, as shown in FIG. 1. From the check valve 44, the working fluid 42F is recirculated through the cooling heat-exchanger 30.

In the illustrative embodiment, the pump 40 does not include moving parts. In some embodiments, the pump 40 is an ejector pump. In some embodiments, the pump 40 is an impulse pump. In some embodiments, the pump 40 is any other suitable pump including pumps with moving parts such as, but not limited to, diaphragm, centrifugal, gear, rotary vane, lobe, piston and/or pumps. A diameter of conduits fluidly connecting each of the components in the power-generation system 10 may be chosen so that additional valves are not used. For example, from the outlet of the compressor 22, a conduit directing the compressed working fluid 42A to the heat recuperator 28 may have a larger diameter than a conduit directing the compressed working fluid 42A to the pump 40 to set a particular flow rate to each component.

The motor-generator 18 is operable in various modes, such as a power generation mode and a motor mode. In the power generation mode, the motor-generator 18 is driven by the turbine 26 via the shaft 32 to produce electrical energy that is supplied to the power conditioning and distribution system 20. In the motor mode, the motor-generator 18 converts electrical energy into rotational power, which may be used to start the turbine engine 14. The power conditioning and distribution system 20 may supply electrical energy to auxiliary systems.

In some embodiments, the electrical system 12 further includes a control system 34, as shown in FIG. 1. The control system 34 controls a speed and/or an operation of the motor-generator 18.

In some embodiments, the turbine engine 14 includes an accumulator 46, as shown in FIG. 1. The accumulator 46 may be arranged in one or more of a variety of places within the power-generation system 10, such as, for example, downstream of the check valve 44, as shown in FIG. 1, or downstream of the cooling heat-exchanger 30 and upstream of the pump 40. The accumulator 46 stores excess working fluid, such as the heated compressed working fluid 42B, the working fluid 42F, or the cooled low-pressure working fluid 42D.

In some embodiments, the power-generation system 10 includes a controller to operate the valves 36, 38. The controller may operate in different modes by selectively and independently opening and closing the valves 36, 38 depending on an operating condition of the power-generation system 10.

Illustratively, the power-generation system 10 may be arranged in a hermetically-sealed pressure vessel. The pressure vessel is pressurized such that working fluid is less likely to leak out of the power-generation system 10 if a leak were to occur. The working fluid may be any suitable fluid, such as, but not limited to, helium xenon (HeXe) or supercritical carbon dioxide ($sCO_2$).

Figure 2:
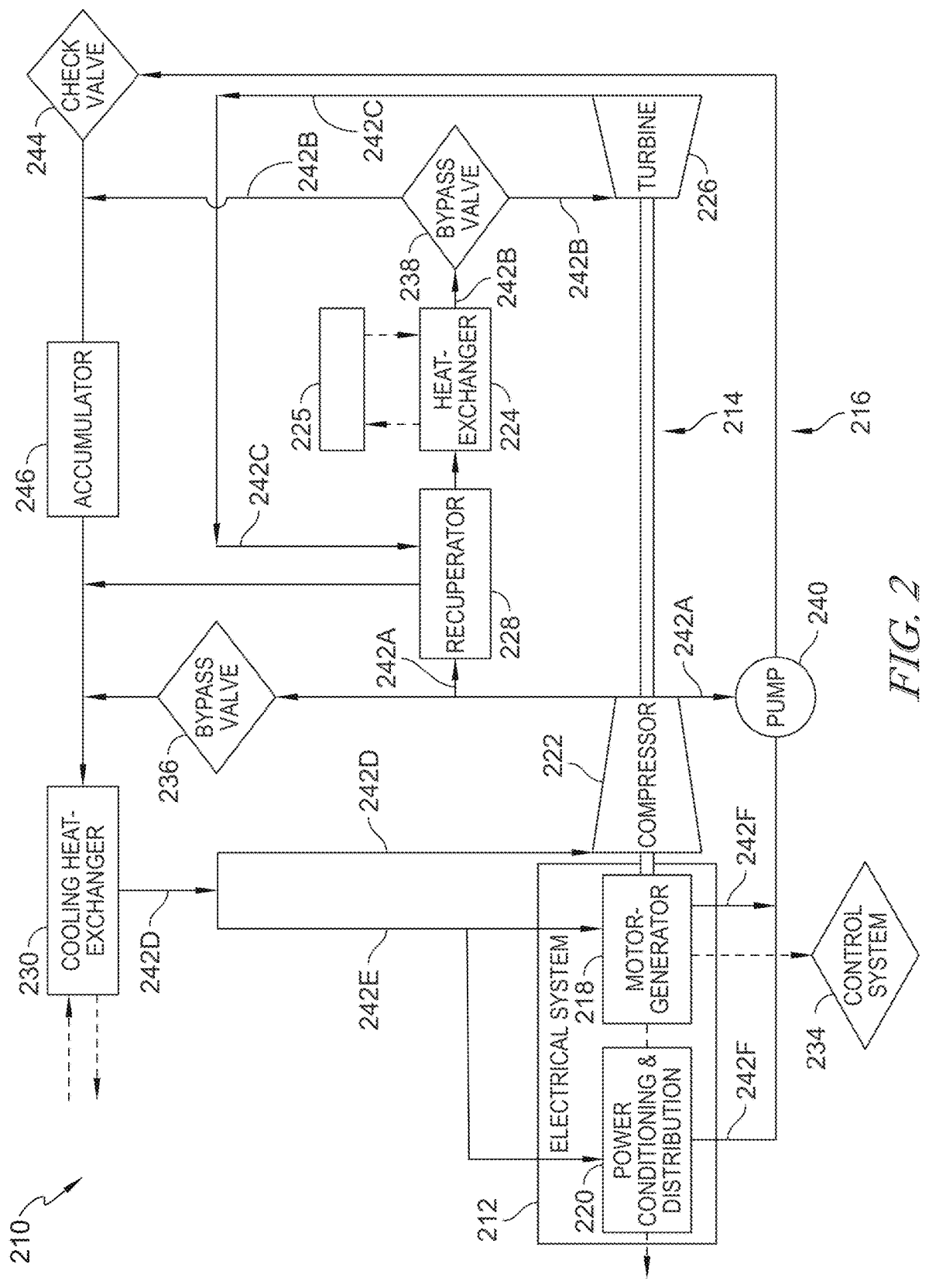

Another embodiment of a power-generation system 210 in accordance with the present disclosure is shown in FIG. 2. The power-generation system 210 is substantially similar to the power-generation system 10 shown in FIG. 1 and described herein. Accordingly, similar reference numbers in the 200 series indicate features that are common between the power-generation system 210 and the power-generation system 10. The description of the power-generation system 10 is incorporated by reference to apply to the power-generation system 210, except in instances when it conflicts with the specific description and the drawings of the power-generation system 210.

The power-generation system 210 includes an electrical system 212, a turbine engine 214, and a cooling system 216, as shown in FIG. 2. A pump 240 of the cooling system 216 is located downstream of the electrical system 212 and draws pressurized cooled working fluid 242E from the cooling heat-exchanger 230.

The electrical system 212 includes a motor-generator 218 and a power conditioning and distribution system 220 coupled with the motor-generator 218, as shown in FIG. 2. The turbine engine 214 includes a compressor 222, a reactor heat-exchanger 224 downstream of the compressor 222, and a turbine 226 downstream of the reactor heat-exchanger 224. The turbine engine 214 further includes a heat recuperator 228 and the cooling heat-exchanger 230 arranged downstream of the turbine 226.

In some embodiments, the electrical system 212 further includes a control system 234, as shown in FIG. 2. The control system 234 controls a speed and/or an operation of the motor-generator 218.

In some embodiments, the turbine engine 214 includes an accumulator 246, as shown in FIG. 2. The accumulator 246 may be arranged in one or more of a variety of places within the power-generation system 210, such as, for example, downstream of the check valve 244, as shown in FIG. 2. The accumulator 246 stores excess working fluid, such as the heated compressed working fluid 242B, the working fluid 242F, or the cooled low-pressure working fluid 242D.

The compressor 222 of the turbine engine 214 receives and compresses a working fluid to provide a compressed working fluid 242A, as shown in FIG. 2. The compressed working fluid 242A is directed toward the heat recuperator 228 and may also flow toward the cooling heat-exchanger 230 depending on a position of a bypass valve 236. The compressed working fluid 242A flows from an outlet of the compressor 222, through the heat recuperator 228, and to the reactor heat-exchanger 224, as shown in FIG. 2. The reactor heat-exchanger 224 transfers heat from a nuclear reactor 225 to the compressed working fluid 242A to provide heated compressed working fluid 242B. The heated compressed working fluid 242B is delivered to an inlet of the turbine 226 and may be bypassed via a bypass valve 238. The turbine 226 extracts work from the heated compressed working fluid 242B to drive the compressor 222 and the motor-generator 218.

From the turbine 226, a low-pressure working fluid 242C is directed toward the heat recuperator 228, as shown in FIG. 2. The heat recuperator 228 transfers heat from the low-pressure working fluid 242C to the compressed working fluid 242A passing from the compressor 222 to the reactor heat-exchanger 224.

The low-pressure working fluid 242C flows from the heat recuperator 228 to the cooling heat-exchanger 230, as shown in FIG. 2. The cooling heat-exchanger 230 transfers heat away from the low-pressure working fluid 242C via a cooling fluid flowing through the cooling heat-exchanger 230. Cooled low-pressure working fluid 242D exits the cooling heat-exchanger 230 and is directed toward the electrical system 212.

The cooling system 216 includes the pump 240, as shown in FIG. 2. The pump 240 is fluidly connected downstream of the electrical system 212. The pump 240 is driven by a portion of the compressed working fluid 242A conducted from the outlet of the compressor 222 and toward the pump 240. The portion of the compressed working fluid 242A drives the pump 240 so that the cooled low-pressure working fluid 242D from the cooling heat-exchanger 230 is pressurized. The pump 240 draws pressurized cooled working fluid 242E from the cooling heat-exchanger 230 to the electrical system 212. The pressurized cooled working fluid 242E is directed through the electrical system 212 to transfer heat from the motor-generator 218 and the power conditioning and distribution system 220 to the pressurized cooled working fluid 242E. The working fluid 242F is discharged from each of the motor-generator 218 and the power conditioning and distribution system 220 and directed through the pump 240 and toward a check valve 244, as shown in FIG. 2.

Closed Brayton cycle systems may be used for terrestrial or space satellite power generation using nuclear reactions. Closed Brayton cycle systems may be used with a nuclear reactor to provide a combustion heat source. Closed Brayton cycle systems may be more efficient at converting nuclear reactor heat to electric power than traditional methods such as a radioisotope generator converting heat to power.

Due to the harsh environment around space and other terrestrial uses, it may be difficult to service the hardware and long component life is desirable. It may be advantageous to keep electrical components cool for improved reliability. Cooled working fluid may be used to maintain long-life operating temperatures of motor-generator and power conditioning and distribution systems. These components may use cooled working fluid temperatures below compressor discharge temperatures such that using compressor discharge fluid directly may not be ideal. Turbine exit temperatures may not be ideal either. Cold side heat exchanger temperatures may be ideal temperatures to cool electrical components. However, at the cold side heat exchanger, working fluid is at the lowest pressure point in the closed Brayton cycle system. The low pressure may have limited head to flow across the electrical components and recombine downstream in the flow.

In accordance with the present disclosure, some of the compressor discharge flow, which may be at a maximum system pressure, may be used to drive the pump to boost the cold side heat exchanger pressure, such that cooling across the electrical components is improved and the flow may be recombined downstream of the turbine. The pump may be an ejector pump with no moving components, an impulse pump, or any other pump. The pump may be placed upstream or downstream of the electrical components.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A power-generation system comprising:
    an electrical system including a motor-generator and a power conditioning and distribution system connected with the motor-generator, the motor-generator operable in a power generation mode to produce electrical energy and a motor mode to convert electrical energy into rotational power,
    a turbine engine including a compressor configured to receive a working fluid and compress the working fluid to provide a compressed working fluid, a reactor heat-exchanger downstream of the compressor that transfers heat from a nuclear reactor to the compressed working fluid to provide a heated working fluid, a turbine downstream of the reactor heat-exchanger and configured to extract work from the heated working fluid for driving the compressor and the motor-generator, and a cooling heat-exchanger downstream of the turbine to transfer heat away from the heated working fluid to provide a cooled working fluid, and
    a cooling system that uses the cooled working fluid to cool the electrical system, the cooling system including a pump that moves the cooled working fluid from the cooling heat-exchanger to the electrical system to transfer heat from at least one of the motor-generator and the power conditioning and distribution system to the cooled working fluid,
    wherein the pump is fluidly connected with the compressor and driven by the compressed working fluid to increase a pressure of the cooled working fluid received by the pump.

2. The power-generation system of claim 1, wherein the pump is fluidly connected downstream of the cooling heat-exchanger and upstream of the electrical system to conduct the cooled working fluid from the cooling heat-exchanger toward the electrical system.

3. The power-generation system of claim 1, wherein the pump is fluidly connected downstream of the electrical system and upstream of the cooling heat-exchanger to draw the cooled working fluid from the cooling heat-exchanger through the electrical system.

4. The power-generation system of claim 1, wherein the pump is driven solely by the compressed working fluid.

5. The power-generation system of claim 1, wherein the pump is one of an ejector pump and an impulse turbine.

6. The power-generation system of claim 1, wherein the turbine engine and the cooling system are fluidly connected and provide a closed loop system.

7. The power-generation system of claim 1, wherein the turbine engine further includes a heat recuperator that transfers heat from the heated working fluid received from the turbine to the compressed working fluid passing from the compressor to the reactor heat-exchanger.

8. The power-generation system of claim 1, wherein the motor-generator is coupled with the compressor and configured to operate in the motor mode to start the turbine engine and to operate in the power generation mode to be driven by the turbine and generate the electrical energy.

9. The power-generation system of claim 1, further comprising a check valve arranged downstream of the pump to prevent backflow of the cooled working fluid.

10. A power-generation system comprising:
    an electrical system including a motor-generator and electrical equipment connected with the motor-generator,
    a turbine engine including a compressor configured to receive a working fluid and compress the working fluid to provide a compressed working fluid, a heat source that transfers heat to the compressed working fluid to provide a heated working fluid, a turbine fluidly connected with the compressor to extract work from the heated working fluid, and a first heat-exchanger fluidly connected with the turbine to transfer heat away from the heated working fluid to provide a cooled working fluid, and
    a pump in fluid communication with the first heat-exchanger and driven by the compressed working fluid received from the compressor to conduct a portion of the cooled working fluid from the first heat-exchanger to the electrical system to cool at least one of the motor-generator and the electrical equipment.

11. The power-generation system of claim 10, wherein the heat source includes a second heat-exchanger configured to transfer heat from a nuclear reactor to the compressed working fluid.

12. The power-generation system of claim 11, wherein the heat source includes a third heat-exchanger fluidly connected with the turbine and configured to transfer heat from the heated working fluid received from the turbine to the compressed working fluid passing from the compressor to the second heat-exchanger.

13. The power-generation system of claim 10, wherein the pump is fluidly connected downstream of the first heat-exchanger and upstream of the electrical system to conduct the cooled working fluid from the first heat-exchanger toward the electrical system.

14. The power-generation system of claim 10, wherein the pump is fluidly connected downstream of the electrical system and upstream of the first heat-exchanger to draw the cooled working fluid from the first heat-exchanger through the electrical system.

15. The power-generation system of claim 10, wherein the pump is one of an ejector pump and an impulse turbine.

16. The power-generation system of claim 10, wherein the turbine engine and the pump are fluidly connected and provide a closed loop system.

17. A method of operating a power-generation system, the method comprising:
- compressing a working fluid with a compressor to provide a compressed working fluid,
- heating the compressed working fluid to provide a heated working fluid,
- extracting work from the heated working fluid with a turbine after the heating to provide a low-pressure working fluid,
- cooling the low-pressure working fluid after extracting the work from the heated working fluid to provide a cooled low-pressure working fluid,
- driving a generator with the work extracted from the turbine to produce electrical energy,
- conducting the electrical energy to electrical equipment,
- increasing a pressure of the cooled low-pressure working fluid using a portion of the compressed working fluid to provide pressurized cooled working fluid, and
- cooling at least one of the generator and the electrical equipment with the pressurized cooled working fluid.

18. The method of claim 17, further comprising recirculating the pressurized cooled working fluid through the power-generation system.

19. The method of claim 17, wherein a pump is fluidly connected with the compressor and is driven by the compressed working fluid to increase the pressure of the cooled low-pressure working fluid.

20. The method of claim 19, wherein the pump is fluidly connected upstream of the generator and the electrical equipment to conduct the pressurized cooled working fluid toward the generator and the electrical equipment.

* * * * *